March 26, 1957 H. D. EVANS 2,786,545
CATCH VESSEL FOR SEPARATING PARTICLES
FROM ROTATING FLUID STREAMS
Filed May 13, 1955
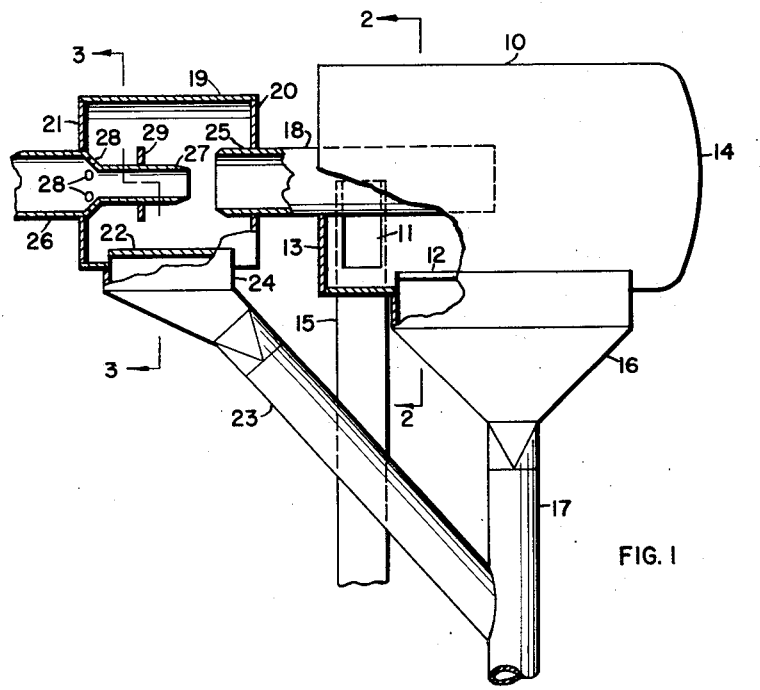
FIG. 1
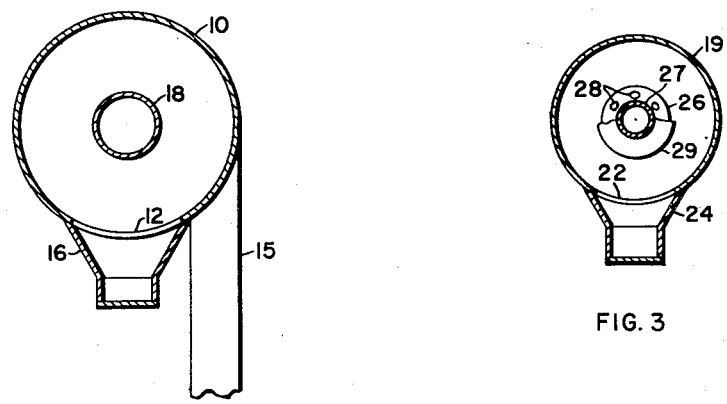
FIG. 2
FIG. 3
INVENTOR
HARRY D. EVANS
BY
HIS ATTORNEY

United States Patent Office 2,786,545
Patented Mar. 26, 1957

2,786,545
CATCH VESSEL FOR SEPARATING PARTICLES FROM ROTATING FLUID STREAMS

Harry D. Evans, Oakland, Calif., assignor to Shell Development Company, New York, N. Y., a corporation of Delaware Application May 13, 1955, Serial No. 508,030
Claims priority, application Netherlands August 31, 1954
4 Claims. (Cl. 183—34)

The invention relates to the separation of suspended particles, either liquid or solid, from rotating fluid streams containing the same. The specific improvement is concerned with a catch vessel having especial although not exclusive utility as a secondary collector for removing entrained particles from the fluid stream that is discharged with a whirling motion from the inner region of a primary centrifugal separator, such as a cyclone or whirl chamber.

The invention finds application, for example, in the separation of solid catalyst particles suspended in gases (used generically herein to include vapors) formed in catalytic cracking processes, the separation of fluidized sand from gases formed in the thermal cracking of a paraffin-containing hydrocarbon fraction, and in the separation of residual liquid from vapors in equilibrium therewith. Such separations are usually effected by means of a centrifugal separator, particularly a cyclone having a centrifugation chamber to which the feed suspension is charged tangentially to form a vortex and to concentrate the suspended particles at the outer wall of the chamber. In many cases the use of a single cyclone is insufficient as the gas withdrawn from the inner part of the vortex through the fluid exit or overflow opening contains solid or liquid particles which have not been removed therefrom or which are re-entrained from the chamber wall. In order to effect as complete as possible a separation of the particles, or to purify the gas or other fluid as completely as possible the effluent fluid can be led tangentially into a second cyclone in which a further separation or purification takes place. This usually results in erosion and unduly high pressure drop due to the change in flow direction of the fluid streams, and the rotation of the fluid about the stream axis causes undesirable eddy currents in the second cyclone.

According to a publication by Ter Linden in Chemie-Ingenieur-Technik (Weinheim/Bergstr.), vol. 25 (1953), page 330, another solution is also possible. In particular, the gas, not entirely free from particles, which issues from the cyclone and still has a rotating movement so that the particles tend to be concentrated mainly near the inner surface of the overflow discharge tube, is led via a widening supply duct into a larger catch chamber in which a large part of the particles are collected; the additionally purified gas is discharged through a discharge duct that is opposite to and coaxial with the supply duct.

Similar arrangements are disclosed in Netherlands Patent No. 66,244 and U. S. Patent No. 1,888,603; the former uses a discharge pipe having a diameter less than that of the supply pipe to form an annular passage for the escape into the catch chamber of the outer portion of the rotating gas together with entrained particles, while the latter uses supply and discharge ducts of equal diameters.

In many applications the inlet duct leading to the cyclone separator and the discharge line for the separated particles run parallel, while the axis of the centrifugation chamber is such that the inlet duct must make a right angle turn, e. g., when the chamber axis is likewise vertical and the tangential inlet is connected horizontally. This has led to considerable erosion and pressure drop in the inlet duct. This is true also in prior art practice when the centrifugation chamber is mounted with a horizontal axis.

It is an object of this invention to improve the effectiveness of a catch vessel of the type indicated above. A further object is to provide an improved combination of such a catch vessel with a cyclone wherein pressure losses are reduced by avoiding changes in direction in the inlet duct to the cyclone and in the outlet ducts by which the separated particles are discharged from the cyclone and catch vessel.

Now according to the invention it was found that the effectiveness of the catch vessel can be improved by providing opposite, substantially coaxial supply and discharge ducts that communicate with the catch chamber through open ends, the end opening in the discharge having a cross sectional area that is smaller than that of the supply duct and also smaller than the body part of the discharge duct beyond the open end, and providing one or more openings, such as small holes or slots in the discharge duct some distance back from the open end. In the preferred arrangement the discharge duct has a short tubular tip of reduced diameter and the openings are located at the juncture of the tip with the larger-diameter body; also, the improvement is advantageously intensified by providing a collar-shaped baffle around the tip so as to shield the said openings from the direct impingement of fluid escaping from the supply duct.

The fluid, burdened with suspended particles, is admitted with a rotating motion, which may be induced by any suitable device. In a preferred arrangement the supply duct is an extension of the overflow duct of a cyclone the centrifugation chamber of which is coaxial with the supply duct and which has a tangential inlet duct, this inlet duct as well as the discharge ducts by which particles are withdrawn from the cyclone and from the catch vessel being situated substantially parallel to a common plane on a common side of said axis, e. g., parallel to one another, whereby the aforementioned difficulties due to bends in these ducts are obviated.

The invention will be described in detail with reference to the accompanying drawing showing a preferred embodiment by way of example, wherein:

Figure 1 is an elevation view through a cyclone and catch vessel constructed in accordance with the invention, parts being shown in section; and Figures 2 and 3 are transverse sectional views taken on the lines 2—2 and 3—3, respectively, of Figure 1.

Referring to the drawings in detail, 10 denotes the side wall of a cyclone enclosing a centrifugation chamber and having the shape of a cylinder with a horizontal axis, except for an inlet opening 11 near one end and an underflow discharge opening 12. The latter opening may have any suitable shape and may, for example, be rectangular as shown. The ends are provided with closures 13 and 14 and a vertical inlet duct 15 is connected at the opening 11 substantially tangentially to the wall 10. A hopper 16 may be interposed between the discharge opening 12 and a vertical discharge duct 17 through which the separated particles are withdrawn from the chamber. An overflow exit duct 18 communicates with the central part of the chamber through a central opening in the end closure 13 and may extend into the chamber, as shown, to constitute a vortex finder.

The catch vessel according to the invention includes an enclosing wall 19 the upper part of which may but need not be formed as a surface of revolution about a horizontal axis; it has end closures 20 and 21 and a bottom discharge opening 22 connected to a vertical discharge duct 23 by means of a hopper 24. The duct 23 may be joined to the duct 17, as shown. A supply duct 25 extends into the chamber through the closure 20 at the said horizontal axis and has a fully open end. This duct is advantageously circular in cross section and of uniform diameter to the end, e. g., tapered externally, and is supplied with a rotating stream of the fluid to be purified, e. g., by connection to the overflow duct 18 of the cyclone, with which it is coaxial. A discharge duct extends through the closure 21 coaxially with the supply duct 25 and has body 26 which may have a diameter about the same as that of the supply duct and an open-ended tip 27 with a cross sectional area smaller than the body 26 and the end of the supply duct. The tip 27 is advantageously circular in cross section and tapered externally. A plurality, e. g., five, of small openings 28 are provided in the discharge duct, either in the tip 27 or in the larger-diameter body 26, preferably substantially at the junction thereof to the reduced-diameter tip 27. An optional though preferred element is a collar-like annular baffle 29 mounted about the tip 27 and having an outside diameter at least equal to the diameter of the supply duct 25. The opposed open ends of the supply and discharge ducts are preferably in close proximity.

As applied, for example, to the separation of fine solids such as sand or catalyst from a gas, the initial suspension is admitted through the inlet duct 15 tangentially to the wall 10 to form a vortex. The suspended particles are flung against the chamber wall by centrifugal force and pass through the underflow discharge opening 12 into the hopper 16 and discharge duct 17, while the gas, largely but not entirely freed from solids, is discharged from the inner part of the vortex via the overflow duct 18. This gas stream rotates with a high angular velocity and flows through the supply duct 25 into the catch chamber within the wall 19. Because of the rotation of the gas the entrained particles are concentrated at the periphery, leaving a core that is free from or contains a minor amount of such solids. This core flows for the greater part directly into the open end of the tip 27 at the end of the discharge tube while the peripherally outer layer of the gas enters the catch chamber with a rotary motion. The particles are thereby carried to the chamber wall and pass through the discharge opening 22 into the hopper 24 and discharge duct 23. The gas thereby admitted to the catch chamber flows out through the openings 28 and joins the gas that entered the tip 27.

The collar baffle 29 intensifies the separating action by deflecting the peripherally outer layer of gas toward the chamber wall without direct flow to the openings 28, where it would carry particles into the purified gas that enters these openings.

The combination of the catch vessel with the cyclone shown may be mounted, for example, as a separator for solid particles in the top part of a reactor or regenerator of a catalytic cracking plant or in a thermal cracking plant wherein hot fluidized sand is used. In the arrangement shown the presence of right-angle bends is avoided in that the initial suspension enters the cyclone vertically and the discharged solids are also discharged downwardly, substantially vertically. The erosion phenomena previously mentioned are eliminated and reduced pressure drops are encountered.

I claim as my invention:

1. A catch vessel for separating suspended particles from a rotating fluid stream containing the said particles, comprising: an enclosing wall defining a catch chamber; a supply duct for said rotating fluid stream having an open, centrally unobstructed end communicating directly with said chamber for admitting said stream as a radially continuous stream; a discharge duct having a body extending out of said chamber and an open end communicating directly with said chamber in opposed and substantially coaxial relation to the said open end of the supply duct, the cross sectional area of the said open end of the discharge duct being smaller than that of the said body and also smaller than that of the said open end of the supply duct for receiving the core of said stream, said discharge duct having one or more openings spaced from the open end thereof and in communication with said chamber; a baffle surrounding the discharge duct between the said openings and the open end of the discharge duct; and a discharge opening for removing separated particles from the chamber.

2. A catch vessel for separating suspended particles from a rotating fluid stream containing the said particles, comprising: an enclosing wall defining a catch chamber; a supply duct having an open, centrally unobstructed end communicating directly with said chamber for admitting said stream as a rotating, radially continuous stream; a discharge duct having a body extending out of said chamber, a tubular entrance tip of lesser cross sectional area than said body joined thereto and being fully open at one end in opposed and substantially coaxial relation to the said open end of the supply duct, the said open end of the tip being smaller than, axially spaced from, and in close proximity to the open end of the supply duct, for receiving the core of said stream, said discharge duct having a plurality of openings which are situated at the juncture of said body and tip and in communication with said chamber; and a discharge opening for removing separated particles from the chamber.

3. In combination with a catch vessel according to claim 2, a second discharge duct connected to the said discharge opening of the catch chamber extending in a direction substantially transverse to the axis of the supply duct; a centrifugation chamber including an enclosing wall that is substantially coaxial with said axis, and end closures; an axial fluid exit tube for the centrifugation chamber interconnecting the latter through one end closure thereof to said supply duct; an inlet duct for said centrifugation chamber disposed to admit fluid burdened with said particles tangentially to the chamber near said one end closure thereof; a discharge opening for separated particles in a peripheral part of the enclosing wall of the centrifugation chamber; and a third discharge duct connected to the last-mentioned discharge opening, the axes of said second and third discharge ducts and of said inlet duct being situated substantially parallel to a common plane and on a common side of the said axis.

4. A catch vessel for separating suspended particles from a rotating fluid stream containing said particles, comprising: an enclosing wall defining a catch chamber; coaxial, opposed supply and discharge ducts situated substantially at said axis and communicating through open, centrally unobstructed ends thereof directly with said chamber, the ends of said ducts being in close proximity, the said supply duct being circular in cross section and uniform diameter to the end, and the discharge duct including a body and a tubular tip of circular cross section with a cross sectional area that is smaller than that of the open end of the supply duct and also smaller than said body, said body having one or more small openings situated at the juncture thereof with said tip; a baffle ring of outside diameter at least as great as the diameter of the supply pipe surrounding the said tip and situated between said small openings and the end of the tip; and a discharge opening for removing separated particles from the chamber.

References Cited in the file of this patent
UNITED STATES PATENTS

| 1,267,715 | Tutweiler | May 28, 1918 |
| 1,525,249 | Mastenbrook | Feb. 3, 1925 |
| 1,708,653 | Boyrie | Apr. 9, 1929 |
| 2,059,521 | Hawley | Nov. 3, 1936 |
| 2,580,317 | Pekar et al. | Dec. 25, 1951 |
| 2,650,675 | Yellott | Sept. 1, 1953 |
| 2,698,672 | Burnside et al. | Jan. 4, 1955 |

FOREIGN PATENTS

| 300,841 | Great Britain | Nov. 22, 1928 |
| 427,251 | Italy | Sept. 17, 1943 |
| 882,543 | Germany | July 9, 1953 |